3,578,678
HYDROXYCARBAZOLE DIONES
Ruddy Littell, Rivervale, and George Rodger Allen, Jr., Old Tappan, N.J., assignors to American Cyanamid Company, Stamford, Conn.
No Drawing. Filed May 9, 1969, Ser. No. 823,512
Int. Cl. C07d 27/68
U.S. Cl. 260—315        4 Claims

ABSTRACT OF THE DISCLOSURE

The preparation of 4a,7,8,9a-tetrahydro-9a-hydroxy-carbazole-3,4-(4H,6H)-diones by reaction of a 2-trifluoromethyl-1,4-benzoquinone with an amino or lower alkyl-amino-2-cyclohexen-1-one, is described. The compounds are physiologically active on the central nervous system and are useful as tranquilizers.

SUMMARY OF INVENTION

This invention relates to novel 4a,7,8,9a-tetrahydro-9a-hydroxycarbazole-3,4-(4H,6H)-diones of the formula:

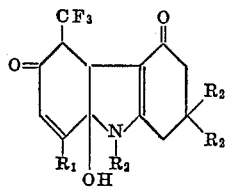

wherein $R_1$ is selected from the group consisting of hydogen and chlorine and $R_2$ is selected from the group consisting of hydrogen and lower alkyl.

The compounds of this invention are, in general, crystalline solids having characteristic melting points and absorption spectra. They are appreciably soluble in many organic solvents such as lower alkanols, acetone, ethyl acetate, dimethylsulfoxide, and the like. They are, however, generally insoluble in water.

The compounds of the present invention may be prepared as illustrated in the following equation:

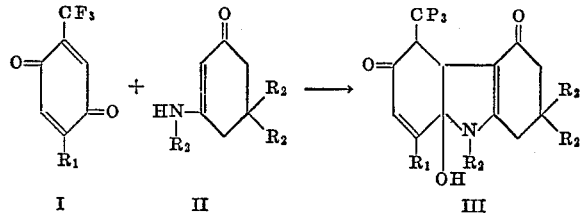

wherein $R_1$ and $R_2$ are as defined hereinbefore. In accordance with this equation reaction of a 2-trifluoromethyl-1,4-benzoquinone (I), optionally substituted in the 5-position, with a 3-amino-2-cyclohexen-1-one or a 3-lower alkylamino-2-cyclohexen-1-one (II), optionally substituted in the 5-position by lower alkyl groups, produces the novel 4a,7,8,9a-tetrahydro-9a-hydroxycarbazole-3,5(4H,6H)-diones (III) of the present invention. The reaction is performed preferably using substantially molar equivalents of (I) and (II). However, the quinone (I) may be used in excess amounts. Suitable solvents for the reaction are the lower alkanoic acids such as, for example, propionic acid, butyric acid, and the like, and the lower alkanols such as methanol, ethanol and the like. When the lower alkanoic acids are utilized as the solvents, the reaction is conducted preferably at 0° C. to 45° C. With the lower alkanols as the reaction solvent, temperatures from 0° C. to approximately 100° C. may be employed; in this instance, it is often convenient to conduct the reaction at the boiling point of the alkanol solvent. The reaction is rapid, product being isolated after a reaction time of one-half hour. Howeved, the reaction time may be extended to approximately 4 hours without deleterious effect. The product (III) of the reaction may be isolated and purified by methods well known to those skilled in the art.

The trifluoromethylbenzoquinones (I) and many of the 3-amino-2-cyclohexen-1-ones of 3-substituted amino-2-cyclohexen-1-ones (II) which serve as the starting materials for the novel compounds of the present invention are known compounds; those which are unknown may be prepared by procedures well known in the art.

The compounds of the present invention are physiologically active on the central nervous system. They show high activity as tranquilizers at non-toxic dose. A useful test for tranquilizer activity consists of measuring the reduction of spontaneous motor activity in animals by means of an actophotomer (a photoelectric device for quantitatively measuring locomotor activity). Graded doses of the active compounds prepared by the process of this invention are administered to groups of mice, and the effective dosage range for a significant reduction of motor activity ( a measure of tranquilization) compared to control groups is established. The use of reduced motor activity as a measure of tranquilizing activity has been described by W. D. Gray, A. C. Osterberg and C. E. Rauh, Archieves Internationales et de Therapie, vol. 134, p. 198 (1961), and W. J. Kinnard and C. J. Carr, Journal of Pharmacology and Experimental Therapeutics, vol. 121, p. 354 (1957).

DETAILED DESCRIPTION

The following examples describe in greater detail the novel 4a,7,8,9a-tetrahydro-9a-hydroxycarbazole-3,5(4H, 6H)-diones of the present invention.

EXAMPLE 1

Preparation of 4a-7,8,9a-tetrahydro-9a-hydroxy-4-trifluoromethylcarbazole-3,5-(4H,6H)-dione A solution of 600 mg. (3.4 mmoles) of 2-triflouromethyl-1,4-benzoquinone and 380 mg. (3.4 mmoles) of 3-amino-2-cyclohexen-1-one in 5 ml. of ethanol is heated at reflux temperature for one hour. Benzene (5 ml.) is added, and the solution is cooled and filtered to give 500 mg. of 4a,7,8,9a-tetrahydro-9a-hydroxy-4-trifluoromethylcarbazole-3,5(4H,6H)-dione as a tan powder. Recrystallization from methanol and then from ethanol gives white crystals, melting point 215° C., dec.

EXAMPLE 2

Preparation of 4a,7,8,9a-tetrahydro-9a-hydroxy-7,7-dimethyl-4-trifluoromethylcarbazole-3,5(4H,6H)-dione A solution of 2.00 g. (12 mmoles) of 2-trifluoromethyl-1,4-benzoquinone and 1.4 g. (10.0 mmoles) of 3-amino-5,5-dimethyl-2-cyclohexen-1-one in 10 ml. of glacial acetic acid is allowed to warm by the reaction exotherm. Crystals appear, and after one-half hour the mixture is cooled and filtered. The solid is washed with ether to give 1.10 g. of 4a,7,8,9a-tetrahydro-9a-hydroxy-7,7-dimethyl-4-trifluoromethylcarbazole-3,5-(4H,6H)-dione as white crystals. Crystallization from methanol gives crystals, melting point 237°–240° C., dec.

EXAMPLE 3

Preparation of 1-chloro-4a,7,8,9a-tetrahydro-9a-hydroxy-7,7-dimethyl-4-trifluoromethylcarbazole - 3,5(4H,6H)-dione A solution of 421 mg. (2.0 mmoles) of 2-chloro-5-trifluoromethyl - 1,4 - benzoquinone and 278 mg. (2.0 mmoles) of 3-amino-5,5-dimethyl-2-cyclohexen-1-one in 5 ml. of glacial acetic acid is allowed to stand at ambient temperature for one-half hour. The solution is cooled in ice, and the solid that separates is collected by filtration, washed with benzene and dried to give 247 mg. of crystals. The material is recrystallized from dilute methanol to give 1-chloro-4a,7,8,9a-tetrahydro-9a-hydroxy-7,7-dimethyl-4-trifluoromethylcarbazole-3,5(4H,6H)-dione as white crystals, melting point 250°–251° C., dec.

EXAMPLE 4

Preparation of 4a,7,8,9a-tetrahydro-9a-hydroxy-9-methyl-4-trifluoromethylcarbazole-3,5(4H,6H)-dione A stream of methylamine is introduced into a solution of cyclohexane-1,3-dione in toluene while the solution is heated at reflux temperature. The reaction is followed by withdrawal of aliquots at appropriate intervals and examination by thin layer chromatography. When the reaction is complete, as judged by this criterion, the hot solution is cooled to give 3-methylamino-2-cyclohexen-1-one.

A solution of 3-methylamino-2-cyclohexen-1-one, prepared as described above, and 2-trifluoromethyl-1,4-benzoquinone in acetic acid is allowed to stand at ambient temperature for forty five minutes. The resulting crystals are removed to give 4a,7,8,9a-tetrahydro-9a-hydroxy-9-methyl-4-trifluoromethylcarbazole-3,5(4H,6H)-dione.

EXAMPLE 5

Preparation of 4a,7,8,9a-tetrahydro-9a-hydroxy-7-methyl-4-trifluoromethylcarbazole-3,5(4H,6H)-dione When a solution of 5-methylcyclohexane-1,3-dione in toluene is treated with a stream of ammonia by the procedure of Example 4, 3-amino-5-methyl-2-cyclohexen-1-one results.

When the procedure of Example 2 is followed and 3-amino-5-methyl-2-cyclohexen-1-one is treated with 2-trifluoromethyl-1,4-benzoquinone in acetic acid, there results 4a,7,8,9a - hydroxy-7-methyl-4-trifluoromethylcarbazole-3,5(4H,6H)-dione.

We claim:
1. A tetrahydro-9a-hydroxycarbazole of the formula:

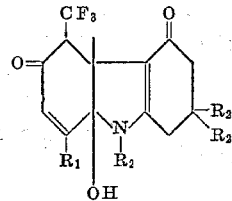

wherein $R_1$ is selected from the group consisting of hydrogen and chlorine and $R_2$ is selected from the group consisting of hydrogen and lower alkyl.

2. The tetrahydro-9a-hydroxycarbazole according to claim 1: 4a,7,8,9a-tetrahydro-9a-hydroxy - 4 - trifluoromethylcarbazole-3,5-(4H,6H)-dione.

3. The tetrahydro-9a-hydroxycarbazole according to claim 1: 4a,7,8,9a-tetrahydro-9a-hydroxy-7,7-dimethyl-4-trifluoromethylcarbazole-3,5-(4H,6H)-dione.

4. The tetrahydro-9a-hydroxycarbazole according to claim 1: 1-chloro-4a,7,8,9a-tertahydro-9a-hydroxy-7,7-dimethyl-4-trifluoromethylcarbazole-3,5-(4H,6H)-dione.

References Cited

UNITED STATES PATENTS 1,999,341  4/1935  Muth _____ 260—315

HENRY R. JILES, Primary Examiner

S. D. WINTERS, Assistant Examiner

U.S. Cl. X.R.

424—274; 260—586, 563